United States Patent
Hansen

[11] Patent Number: 5,961,866
[45] Date of Patent: Oct. 5, 1999

[54] FOOD HEATING UNIT

[75] Inventor: William J. Hansen, Brookfield, Wis.

[73] Assignee: Alto-Shaam, Inc., Menomonee Falls, Wis.

[21] Appl. No.: 09/210,193

[22] Filed: Dec. 11, 1998

Related U.S. Application Data

[63] Continuation-in-part of application No. 08/624,784, Mar. 27, 1996, abandoned.

[51] Int. Cl.[6] .............................. A47J 39/02; H05B 3/06
[52] U.S. Cl. ........................ 219/434; 219/403; 219/413; 219/433; 219/436; 219/494
[58] Field of Search .................................... 219/403, 407, 219/409, 412, 413, 429, 433, 434, 436, 438, 447, 458, 459, 463, 467, 544, 448, 494

[56] References Cited

U.S. PATENT DOCUMENTS

| | | |
|---|---|---|
| 2,259,519 | 10/1941 | Ershler . |
| 2,679,841 | 5/1954 | Muckler . |
| 2,843,716 | 7/1958 | Del Francia . |
| 3,161,755 | 12/1964 | Tilus . |
| 3,489,880 | 1/1970 | Bloomfield et al. . |
| 3,600,554 | 8/1971 | Bange ..................................... 219/447 |
| 4,245,613 | 1/1981 | Wells et al. ............................. 219/413 |
| 4,691,096 | 9/1987 | Knauss ...................................... 99/403 |
| 4,717,809 | 1/1988 | Schwizer . |
| 4,794,228 | 12/1988 | Braun, Jr. . |
| 4,849,609 | 7/1989 | Perrichon . |
| 4,852,749 | 8/1989 | Fernandez et al. . |
| 4,859,833 | 8/1989 | Petersen . |
| 4,904,848 | 2/1990 | Colevas . |
| 4,998,007 | 3/1991 | Knauss ................................... 219/438 |
| 5,413,032 | 5/1995 | Bruno et al. ............................ 219/436 |
| 5,498,853 | 3/1996 | Gross et al. ............................ 219/463 |

FOREIGN PATENT DOCUMENTS

| | | |
|---|---|---|
| 0177446 | 7/1985 | European Pat. Off. . |
| 2609794 | 9/1977 | Germany . |
| 2612635 | 10/1977 | Germany . |
| 416106 | 9/1934 | United Kingdom . |
| 1556796 | 11/1979 | United Kingdom . |

*Primary Examiner*—Jospeh Pelham
*Attorney, Agent, or Firm*—Andrus, Sceales, Starke & Sawall

[57] ABSTRACT

A food warming and holding receptacle lowered by a source of electrical energy comprises a well supported on a planar surface, and at least one tray containing food disposed in the well. A sheath is fixed to the well and at one-piece, flattened, looped heating element is slidably mounted in the she the and connected with the source of electrical energy for conveying heat to the food in the tray. A temperature sensor is slidably mounted in the sheath for monitoring the temperature of the heating element.

5 Claims, 2 Drawing Sheets

FOOD HEATING UNIT

CROSS REFERENCE TO RELATED APPLICATION

This application is a continuation-in-part application of U.S. Ser. No. 08/624,784, filed Mar. 27, 1996 now abandoned.

FIELD OF THE INVENTION

This invention relates broadly to food heating apparatus of the type employed in delicatessens and restaurants, and, more particularly, pertains to a burnerless food heating unit equipped with a heating element for maximizing heat transfer to the food.

BACKGROUND OF THE INVENTION

It has always been a concern for those in the food service industry to efficiently and safely maintain and control the heat suplied to food such as that served from an open warming well or a closed oven. One aceptable method for heating food resides in the use of a high temperature, tubular heating cable which is strung or wrapped repeatedly back and forth at regular intervals on a well or oven framework beneath a conductive metal surface. Such heating cable is typically comprised of a high resistance nichrome conductor, an insulation layer of mica tape, a wrap of Teflon impregnated glass tape, a fiberglass braid for strength and an outermost protective jacket. The heating cable is connected with suitable electrical thermostat controls and is connected to a source of electrical utility power so as to convert electrical energy into heat.

Unfortunately, use of the tubular heating cable as described above poses a number of problems. One of the drawbacks exists in the labor intensive efforts required to manually string the cable. Another drawback is found in the serviceability of the cable which is difficult to access once installed. Perhaps the most critical problem lies in the inefficiency of the heating cable to provide uniform heat to the food in the trays or oven. Uneven high temperatures sometimes result in undesirable warping of the conductive metal surface.

Accordingly, it remains desirable to provide an improved food heating unit which offers a greater efficiency in heat distribution to certain zones with improved control therein. It is also desirable to provide an improved food warming and holding unit which is simple to assemble, and which utilizes common parts which are easy to service and/or replace. It remains further desirable to employ a heating element which will retain the stiffness of the conductive metal surface.

SUMMARY OF THE INVENTION

The present invention advantageously provides a food heating system employing an improved heating element which exhibits a marked increase in the amount of heat transfer. The heating element of the present invention provides a greater surface area per linear unit of length which reduces the power requirement previously demanded by the prior art tubular heating cable.

In one aspect of the invention, there is provided a burnerless heating unit for supporting food therein which includes a single, flattened wall defining the base of an open well, and a sheath permanently connected to the wall. A completely flattened, serpentine-shaped heating element is slidably dispose for movement into and out of the sheath for maximizing heat transfer to the wall. The heating element is isolated between the wall and the sheath to superheat an air space above the wall. A control is operably connected with the heating element for controlling the temperature thereof. A sensor is interconnected with the control and is slidably mounted for movement into and out of the sheath for sensing the temperature supplied by the heating element. A V-shaped holder is slidably mounted in the sheath, the holder being engageable with the sensor. The heating element defines a heating zone relative to the wall.

In another aspect of the invention, a food warming and holding receptacle is powered by a source of electrical energy. The receptacle includes a well supported on a planar surface, at least one tray containing food disposed in the well, a sheath permanently fixed to the well, and a one-piece, completely flattened, multiple-looped heating element slidably mounted in the sheath and connected with the source of electrical energy for conveying heat to the food in the tray. The heating element is a continuous member having a pair of terminals connectable with the source of electrical energy. A temperature sensor holder has V-shaped walls within which the temperature sensor is retained, the holder being slidably inserted in the sheath.

In yet another aspect of the invention, a burnerless, warming well-type food heating apparatus is connected to a source of electrical energy. The apparatus includes a well including a stainless steel base mounted on a planar surface. The base has an inner surface and an outer surface and has a plurality of spaced apart support brackets extending from the inner surface thereof. Th apparatus also includes a series of trays containing food, each of the trays having a length and a width, and each of the trays being suspended in the well of the inner surface by an adjacent pair of the support brackets and defining an air space bounded by the inner surface, the adjacent pair of support brackets and an exterior surface of the tray. A multiplicity of stainless steel sheaths is provided, each of the sheaths lying substantially coextensive with the length and the width of one of the trays. Each of the sheaths is permanently mounted to the outer surface between the adjacent pair of support brackets so as to minimize warpage of the base. A completely flattened, serpentine-shaped, rigid heating element formed of a cluster of nickel-chromium resistant wires is slidably mounted in each of the sheaths and lies substantially coextensive with the length and width of each of the trays. The heating element has terminals protruding from the sheath when mounted therein and is connected to a source of electrical energy for controllably superheating the air space and localizing heat transfer to the food in each of the trays. A control is operably connected with the heating element for controlling the temperature thereof. Each of the heating elements is a continuous member having four runs, each adjacent pair of runs being interconnected by a bend. Each of the sheaths is surrounded by a jacket depending from the outer surface of the base and has a width and a length substantially coextensive with the tray. A layer of insulation is disposed between the sheath and the jacket. The heating element is comprised of nickel-chromium resistant wires isolated in the sheath below the base and lying coextensive with the length and width of the tray to provide indirect heat to the base, an then to the air space thereby individually controlling the heating zone around and beneath the tray to more efficiently maintain the desired warmth of the food in the tray.

Still another aspect of the invention relates to a method of supplying a burnerless heating unit for supporting food therein. The method includes the steps of providing a single-flattened wall defining the base of an open well; permanently connecting a sheath to the wall; disposing a completely flattened, serpentine-shaped heating element having multiple loops for slidable movement into and out of the sheath for maximizing heat transfer to the wall, the heat element being isolated between the wall and the sheath to enable superheating of an air space above the wall; sliding a V-shaped holder between adjacent loops of the heating element and between the base and the sheath; and sliding a temperature sensor into the holder.

BRIEF DESCRIPTION OF THE DRAWINGS

The invention will become better understood by reference to the following detailed description of the preferred exemplary embodiment when read in conjunction with the appended drawing wherein like numerals denote like elements, and.

DETAILED DESCRIPTION OF THE PREFERRED EMBODIMENT

Figure 1:
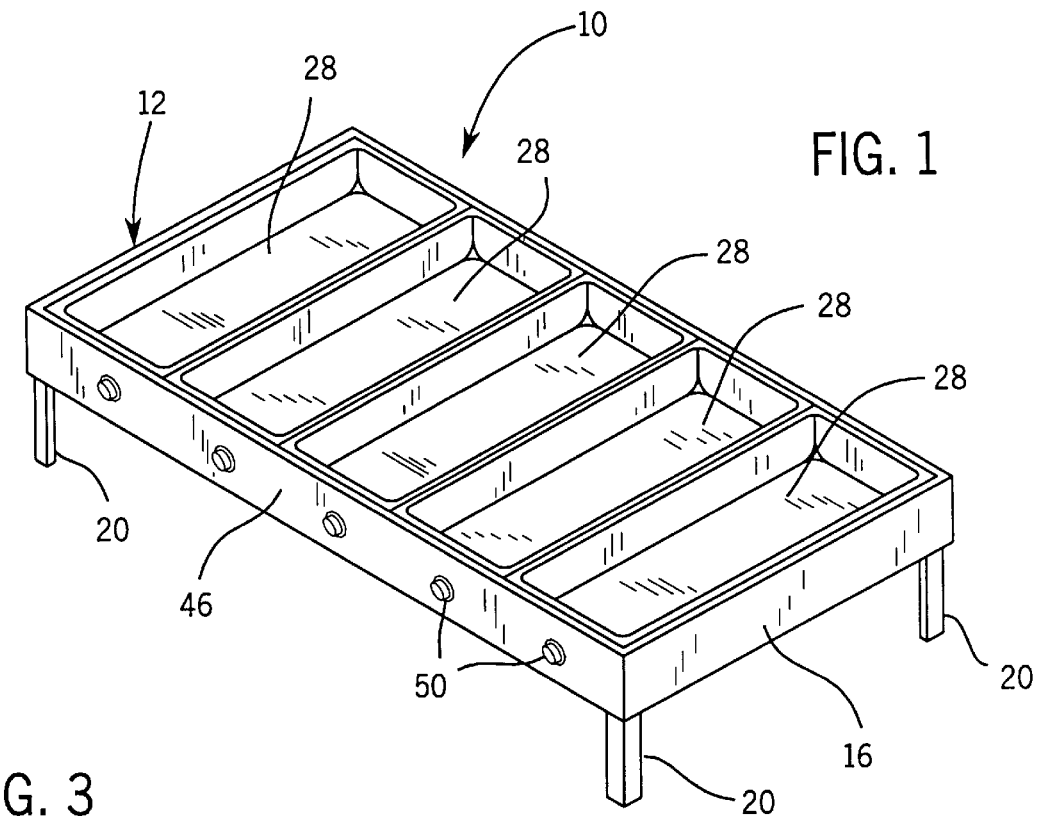
FIG. 1 is perspective, top view of a food heating unit embodying the present invention.

Referring now to the drawings, a food heating unit connectable to a source of electrical energy, such as an electrical utility, is generally identified by the numeral 10. In the preferred embodiment, food heating unit 10 is represented by an open top warming well 12 such as the type employed in a delicatessen or restaurant for warming and holding perishable food. Although not illustrated, it should be understood that the invention is equally applicable to one or more walls of an enclosed oven.

Well 12 includes a generally rectangular, stainless steel base 14 which has end walls 16 and sidewalls 18 and is mounted by a series of legs 20 upon a support surface. Base 14 has an inner, or upper surface 22 as well as an outer, or lower, surface 24. A plurality of spaced apart support brackets 26 extend upwardly from the inner surface 22 and extend along the width of the well 12 for supporting an array of generally rectangular trays 28 containing food. Each of the trays 28 has flanges 30 from which the trays 28 are suspended in the well 12 above the inner surface 22 by adjacent pairs of the support brackets 26. In assembled form, an air space 31 is defined by the inner surface 22, an adjacent pair of support brackets 26, and a respective tray 28.

Mounted to the outer, or lower surface 24 of the base 14 is a series of U-shaped, box-like sheaths 32 disposed between each adjacent pair of support brackets 26. Each of the sheaths 32 is of metallic construction and extends along the length and width of the superposed tray 28.

Figure 4:
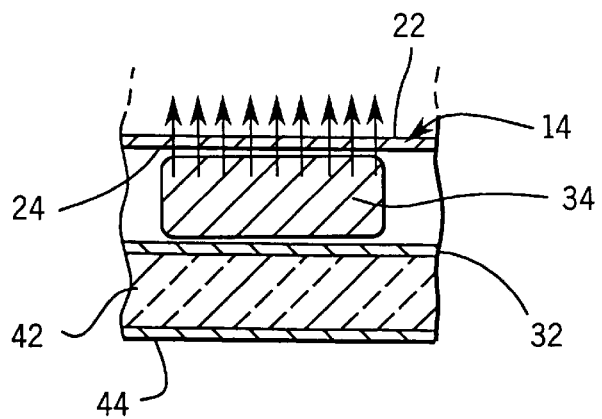
FIG. 4 is cross-sectional, detail view taken on line 4—4 of FIG. 3.
Figure 2:
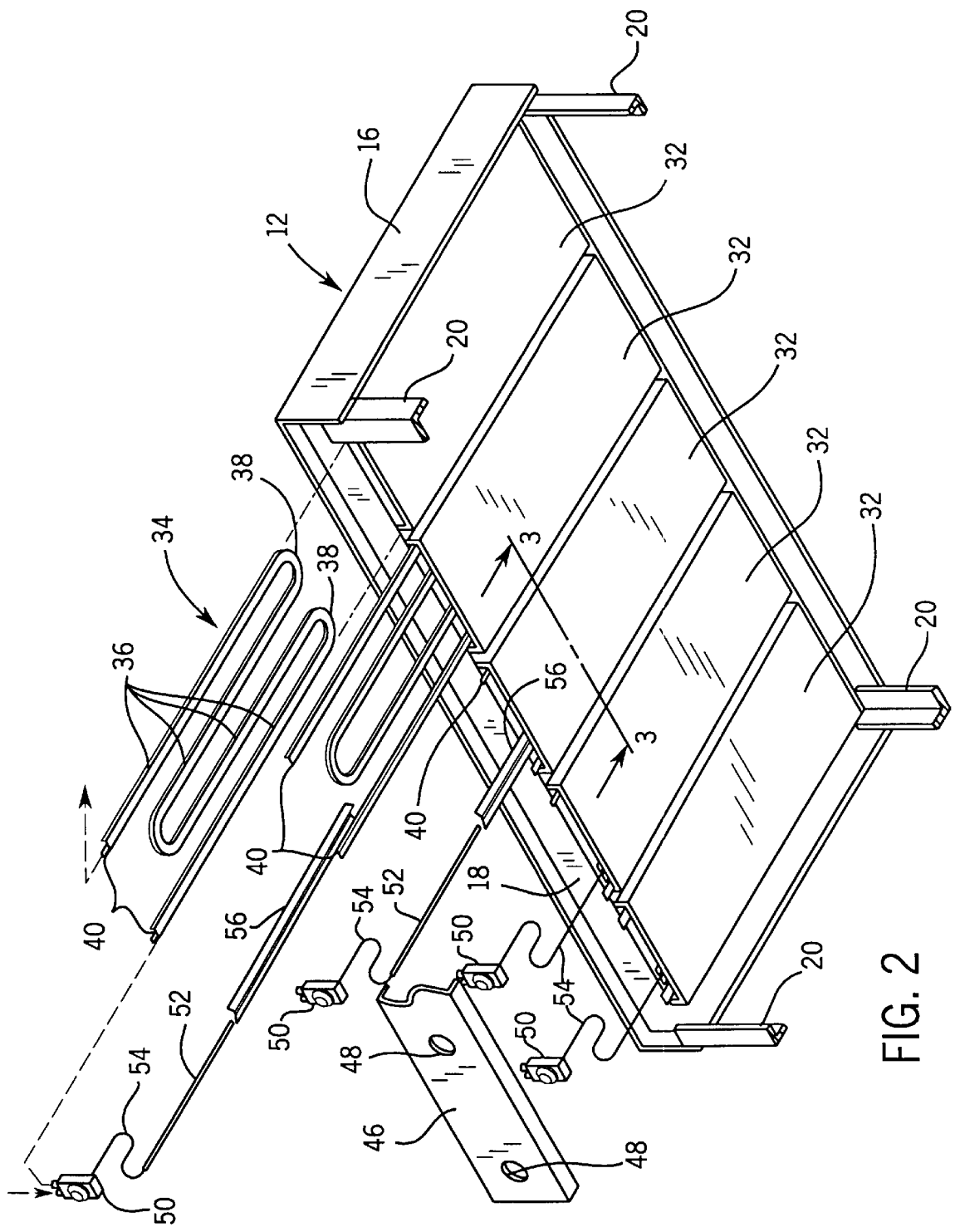
FIG. 2 is a perspective, bottom view of the food heating unit of FIG. 1 illustrating a heating element incorporated therein.

As a salient feature of the invention, a flattened, serpentine-shaped, rigid heating element 34 is slidably mounted in each of the sheaths 32 and lies substantially coextensive with the length and width of respective tray 28. Sheath 32 acts to protectively shield heating element 34 from physical abuse and moisture which can impair the performance of the heating unit 10. Each heating element 34 is a modular, continuous looped component formed with a series of four straight runs 36 interconnected with three bends 38 and extends substantially parallel to the base 14 and the bottom of the tray 28. Heating element 34 is preferably comprised of a cluster of nickel-chromium resistant wires insulated by a layer of magnesium oxide. Such heating element 34 is commercially available from the Watlow Company of St. Louis, Mo. and is sold under the FIREBAR® trademark. In order to supply the heating unit 10 with a source of electrical energy, heating element 34 is provided with a pair of spaced terminals 40 which protrude from the sheath 32 when the heating element 34 is slidably mounted therein. Terminals 40 are engageable with suitable electrical connection structure on a control panel 46 which fits over sidewall 18. Control panel 46 is formed with a series of openings 48 for mounting a series of thermostat controls 50 used to regulate heat control for each tray 28. Heating element 34 is particularly attractive in offering a flattened surface geometry which superheats the air space 31 beneath and around the sides of the tray 28 and maximizes the amount of heat transferred to the base 14. For example, while a prior art tubular heating cable may transfer heat over a width of 0.03", the heating element 34 of the present invention is able to transfer heat over a much larger width of 0.52" for a singular run 36 such as depict d in FIG. 4. Heating element 34 defines a specific zone for each tray 28 in which more power is available per unit length owing to its flattened configuration.

Figure 3:
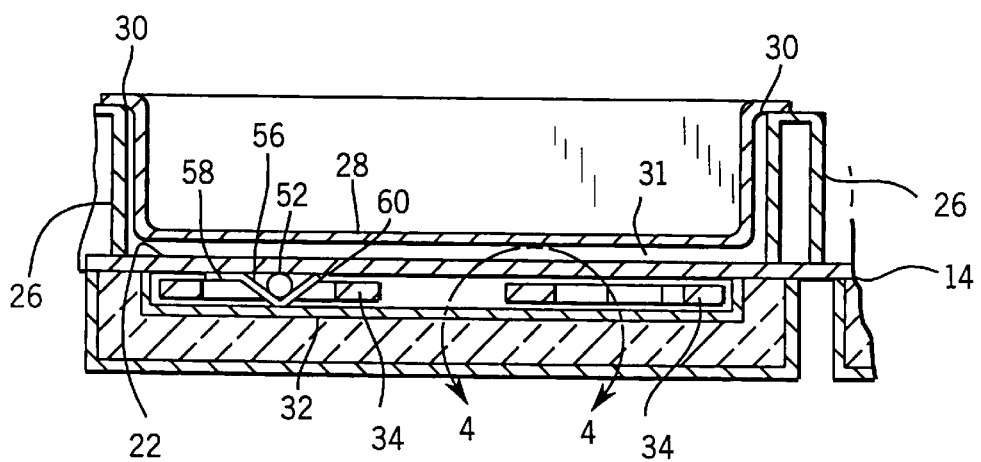
FIG. 3 is a cross-sectional view taken on line 3—3 of FIG. 2.

Because of the protected nature of the heating element 34, it is convenient to locate a thermostat sensor bulb 52 adjacent thereto which will provide accurate temperature feed back. Sensor bulb 52 is a commercially available component connected by suitable wiring 54 to the thermostat control 50 for each heating zone. Bulb 52 is an elongated element in which oil is selectively expanded and reduced in order to turn the heating element 34 on and off according to the desired temperature parameters. In order to maintain the position of bulb 52, a V-shaped holder 56 is slidably mounted between adjacent runs of heating element 34 with a laterally extending portion 58 of the holder 56 interposed between the top of the heating element 34 and the lower surface 24 of base 14. The bottom of V-shaped holder 56 is engageable with the top surface of sheath 32, while an edge 60 of the holes 56 opposite portion 58 also contacts the lower surface 25 of base 14. As shown in FIG. 3, bulb 52 is slidably mounted in the apex of holder 56. In order to ensure that heat energy is directed to the base 14, each sheath 32 is surrounded typically by a 1–1½" layer of insulation 42 which is held in place by a retaining jacket 44.

It should be appreciated that the present invention provides a food heating unit in which the efficiency of heat transfer is vastly improved. Use of the heating element not only simplifies assembly and makes maintenance easier, but provides a modularity which enables quick expansion or reduction of the food heating unit. It also has been found that because the heating element provides a more even transfer of heat, there is a noticeable improvement in well stiffness. Likewise, there is an improved zone control of temperatures. Because of the isolated heating element, each of the warming chambers underlying the trays is easily cleaned. Unlike the prior art, the protected heating element, when exposed to salts and moisture, exhibits low current leakage.

It should be understood that stainless steel, as used in base 14, has a high coefficient of expansion. When heated, it has a natural tendency to warp. One benefit of the invention utilizes box-type construction of the sheaths 32 and stiffening retaining jackets 44. This not only controls design dimensions for clearances of the heating elements 34, bulbs 52, and holders 56, but also provides a visually acceptable smooth surface. With the construction described above, individual zone control of multiple heated areas can be obtained without heat migrating to adjacent zones. Each heated zone is controlled precisely with individual thermostats being disposed in the heat source area.

The present invention also provides a construction which promotes ease of service for all of the components. Prior art designs generally require a complete disassembly of the food unit 10 to service the sensors and heating elements. In contrast, the sheath design described herein allows sensor bulb 52 and flat heater element 34 to easily slide in and out for inspection and replacement. Removal of control panel 46 gives full access to the sensor bulbs 52 and heat elements 34.

In the food heating unit 10 of the present invention, the flat heating element 34 allows superb heat transfer to the desired surface 14. This is markedly advantageous over the prior art round cross section heating element which controls a surface at a tangent point.

While the invention has been described with reference to a preferred embodiment, those skilled in the art will appreciate that certain substitutions, alterations and omissions may be made without departing from the spirit thereof. Accordingly, the foregoing description is meant to be exemplary only, and should not be deemed limitative on the scope of the invention set forth with following claims.

I claim:

1. A burnerless heating unit for supporting food therein comprising:

a single, flattened wall defining a base of a open well;

a sheath permanently connected to said well;

a completely flattened, serpentine-shaped heating element slidably disposed for movement into and out of said sheath for maximizing heat transfer to said wall, said heating element being isolated between said wall and said sheath to superheat an air space above aid wall;

a control operably connected with said heating element for controlling the temperature thereof;

a sensor interconnected with said control and slidably mounted for movement into and out of said sheath for sensing the temperature supplied by said heating element, and a V-shaped holder slidably mounted in said sheath, said holder being engageable with said sensor.

2. The heating unit of claim 1, wherein said heating element defines a heating zone relative to said wall.

3. A food warming and holding receptacle powered by a source of electrical energy, the receptacle comprising:

a well supported on a planar surface;

at least one tray containing food disposed in said well;

a sheath permanently fixed to said well;

a one-piece, completely flattened, multiple-looped heating element slidably mounted in said sheath and connected with said source of electric energy for conveying heat to the food in said tray, wherein said heating element is a continuous member having a pair of terminals connectable with said source of electrical energy;

a temperature sensor slidably mounted in said sheath between adjacent loops of said heating element and operably connected to said source of electrical energy, and a temperature sensor holder having V-shaped walls within which said temperature sensor is retained, said holder being slidably inserted in said sheath.

4. A burnerless, warming well-type food heating apparatus connected to a source of electrical energy, the apparatus comprising:

a well including a stainless steel base mounted on a planar surface, said base having an inner surface and an outer surface, said base having a plurality of spaced apart support brackets extending from said inner surface thereof;

a series of trays containing food, each of said trays having a length and a width, each of said trays being suspended in said well above said inner surface by an adjacent pair of said support brackets and defining an air space bounded by said inner surface, said adjacent pair of support brackets, and a exterior surface of said tray;

a multiplicity of stainless steel sheaths, each of said sheaths lying substantially coextensive with the length and width of one of said trays and being permanently mounted to said outer surface between said adjacent pair of support brackets so as to minimize warpage of said base;

a completely flattened, serpentine-shaped, rigid heating element comprised of a cluster of nickel-chromium resistant wires and slidably mounted in each of said sheaths and lying substantially coextensive with the length and the width of each of said trays, said heating element having terminals protruding from said sheath when mounted therein and connected to a source of electrical energy for controllably superheating said air space and localizing heat transfer to the food in each of said trays;

a control operably connected with said heating element for controlling the temperature thereof;

wherein each of said heating elements is a continuous member having four runs, each adjacent pair of runs being interconnected by a bend;

each of said sheaths being surrounded by a jacket depending from said outer surface of said base and having a width and length substantially coextensive with said tray; and a layer of insulation disposed between said sheath and said jacket, said heating element comprised of nickel-chromium resistant wires being isolated in said sheath below said base and lying coextensive with said length and width of said tray to provide indirect heat to said base and then to said air space thereby individually controlling a heating zone around and beneath said tray to more efficiently maintain the desired warmth of food in said tray, an elongated V-shaped sensor holder slidably mounted between adjacent runs of said heating element, a portion of said holder being disposed between said base and said heating element; and an elongated temperature sensor slidably mounted in an apex of said V-shaped holder for a feedback of temperature to said control.

5. A method of supplying a burnerless heating unit for supporting food therein, said method comprising the steps of:

providing a single, flattened wall defining the base of an open well;

permanently connecting a sheath to said wall;

disposing a completely flattened, serpentine-shaped heating element having multiple loops for slidable movement into and cut of said sheath for maximizing heat transfer to said wall, said heating element being isolated between said wall and said sheath to enable superheating of an air space above said wall;

sliding a V-shaped holder between adjacent loops of said heating element and between said base and said sheath; and sliding a temperature sensor into said holder.

\* \* \* \* \*